Figure 4:
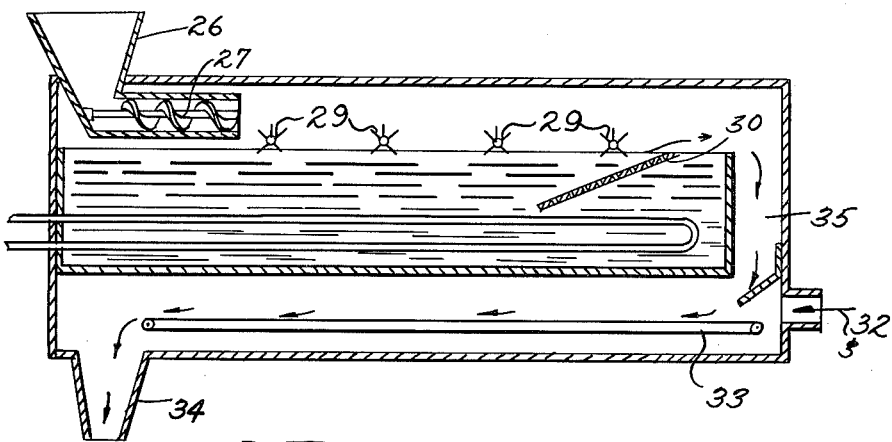

May 22, 1962 T. A. STANLEY 3,035,303
EXTRUSION OF ORGANIC THERMOPLASTIC POLYMERIC MATERIALS
Filed Nov. 2, 1959 2 Sheets-Sheet 1
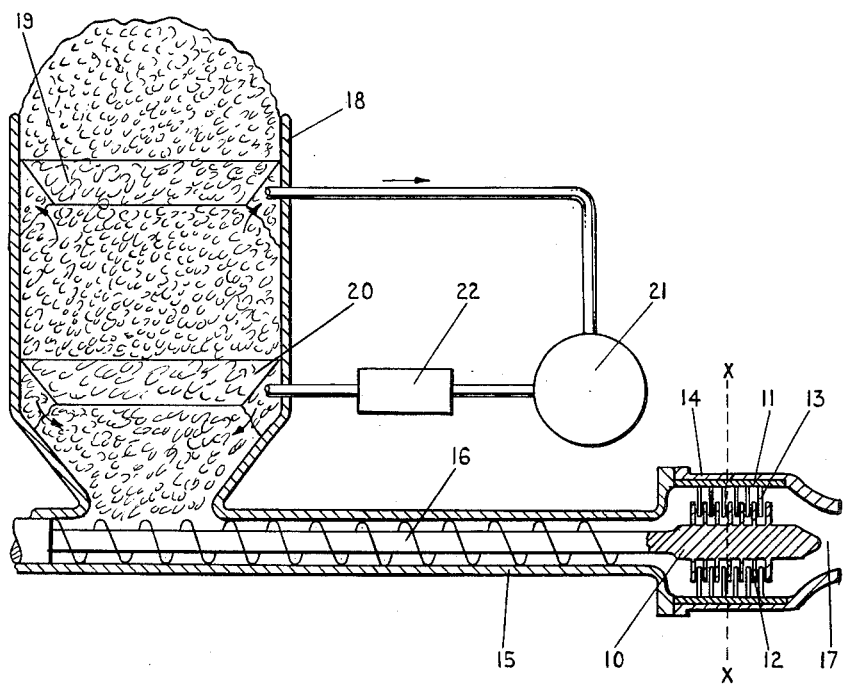
FIG. I.
INVENTOR:
Thomas Alfred Stanley,
BY Cushman, Darby & Cushman
ATTORNEYS.

United States Patent Office 3,035,303
Patented May 22, 1962

3,035,303
EXTRUSION OF ORGANIC THERMOPLASTIC POLYMERIC MATERIALS
Thomas Alfred Stanley, Welwyn Garden City, England, assignor to Imperial Chemical Industries Limited, London, England, a corporation of Great Britain
Filed Nov. 2, 1959, Ser. No. 850,281
Claims priority, application Great Britain Nov. 14, 1958
1 Claim. (Cl. 18—12)

This invention relates to the extrusion of organic thermoplastic polymeric materials.

The extrusion of organic thermoplastic polymeric materials has hitherto been carried out at relatively low extrusion speeds e.g. normally at extrusion speeds of about 60 revolutions per minute. It has been found for a particular extruder screw speed, that if the organic polymeric material is heated immediately before being fed to the extruder, the power consumption during extrusion falls while there is some increase in output. It is possible therefore to increase the speed of the extruder screw and maintain the power consumption at its original level and thus obtain an even higher output of extruded material. It has also been found that preheating minimized the tendency to surge during extrusion.

We have found that while preheating of the polymeric granular or particle material allows the extruder screw speeds to be increased with no increase in power consumption as compared with the use of material fed cold to the extruder, if the extruder screw is rotated at speeds much higher than normal, particularly at speeds greater than 150 revolutions per minute, the extruded product is no longer homogeneous and therefore under existing practice it is necessary to limit the screw speed to less than 150 revolutions per minute. We have now found that if a device capable of subjecting the hot extruded polymeric material to intensive mixing is included between the delivery end of the extruder screw and the extrusion orifice, there is almost no limit to the speed at which the extruder screw can be made to rotate and deliver homogeneous material from the extrusion orifice with the result that very much greater extrusion rates are possible on existing extruders than has hitherto been thought possible.

An object of the present invention is to provide an apparatus for the extrusion of thermoplastic organic polymeric material in which organic polymeric material in granular or particle form is first heated to an elevated temperature but below that at which there is a tendency for the particles to fuse together and while so heated fed to a screw extruder operating at a speed of not less than 150 revolutions per minute and feeding the material as it leaves the delivery end of the screw to a mixing device comprising a pair of coaxial, generally cylindrical members, relatively rotatable about the common axis, one surrounding the other, with the space between the adjacent surfaces providing a passage between the delivery end of the extruder screw and an extrusion orifice and having between said adjacent surfaces means movable across the axial direction of flow of said material by relative movement of the members to interrupt flow in the axial direction, and subjecting the material while in the mixing device to intensive mixing by rotation of one member relative to the other member. Another object of this invention is to provide an apparatus for carrying out the process comprising an extruder with means to rotate the screw thereof at speeds greater than 150 revolutions per minute, means to heat material fed to the extruder screw to any desired temperature and means providing a feed passage between the delivery end of said extruder screw and the extrusion orifice including a mixing device having a pair of coaxial generally cylindrical members, relatively rotatable about the common axis, one surrounding the other with the space between the adjacent surfaces providing the passage, and said adjacent surfaces having between them means movable across the direction of the longitudinal axis of said members by relative movement of said members.

The inner member of said mixing device may be directly coupled with the extruder screw so that both rotate at the same angular velocity. Alternatively, a separate drive may be provided for the mixing device, preferably a variable speed drive, so that angular velocities of the rotating member, equal to or greater or less than that of the extruder screw, may be obtained.

Figure 3:
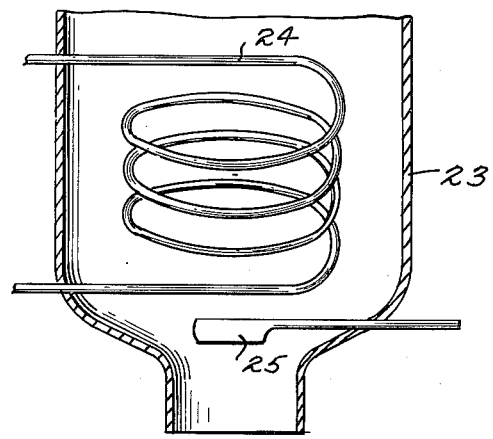
Figure 2:
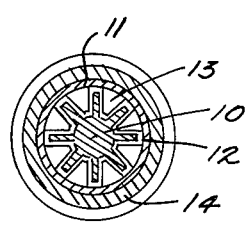

Our apparatus will be illustrated by reference to the accompanying drawings in which FIGURE 1 illustrates a mid-sectional side elevation of the apparatus and FIGURE 2 illustrates a sectional end elevation through the line XX', of FIGURE 1. FIGURE 3 shows the hopper according to FIGURE 1 with a heating means therein according to an alternative embodiment of the present invention. FIGURE 4 shows in elevation yet another means for preheating the material according to another embodiment of the present invention.

In the apparatus illustrated 10 is a spindle carrying at one end uniformly spaced teeth, one of which carries the reference 12 and at the other end a screw shown at 16. The screw 16 forms part of an extrusion machine and is mounted inside the barrel 15. At the feed end of the machine the hopper is shown at 18 filled with material to be extruded. The hopper is fitted with two frusto-conical baffles 19 and 20 below each of which the air entry and exit points are shown. The fan shown at 21 blows air through the heater 22 and into the lower part of the hopper, and withdraws air from the top part of the hopper. The direction of travel of the air is shown by the arrows.

The end of the spindle 10 carrying the teeth forms the inner member of the mixing chamber; the outer member is formed by the cylindrical casing 14 having attached to its inner surface the cylinder 11, which carries uniformly spaced teeth that interleave the teeth of spindle 10; one of these teeth is indicated by the reference 13. FIGURE 1 shows the arrangement of the teeth along the axis of the spindle while FIGURE 2 shows the arrangement of the teeth in the plane at right angles to the axis. The extrusion orifice is shown at 17. For convenience, the various bolts and studs that join the different parts of the apparatus together are not illustrated.

In the apparatus illustrated, the spindle that provides the inner member of our apparatus is shown as an extension of the feed screw and will therefore always rotate with the same angular velocity as the feed screw. It will be appreciated that the spindle need not be so connected. It can be independently driven if desired with a variable speed drive so that the speed of the spindle can be controlled to any desired extent.

Mixing devices of the kind illustrated comprise in essence a toothed rotor and a toothed stator with the teeth of one interleaving the teeth of the other; such devices are particularly useful in combination with an extruder as hereinbefore described for high speed extrusion. They may be made in various ways and may take various forms. For example, they may take the form shown in FIGURES 1 and 2 with each member machined from a single piece of metal, e.g., mild steel, stainless steel or suitable non-ferrous alloy. Alternatively, one or both members may be made up from rings of teeth securely held together. The teeth may also be disposed in various ways along each member. For example, the teeth may be in straight lines or they may be set in staggered rings. Staggering the teeth helps to reduce any slight tendency to pulsate, and for this reason a preferred form of the mixing device is one in which the teeth of one of said stator or rotor are arranged in uniform parallel rows along its length, and the other of said stator or rotor is divided along its length into a plurality of separately removable coaxial parts, the teeth on each part being disposed in the same way as the teeth on the other of said stator and rotor, adjacent coaxial parts being relatively displaced about the longitudinal axis so that the teeth do not form continuous rows from one part to an adjacent part. It will be appreciated that the teeth arranged in said uniform parallel rows may lie parallel to the longitudinal axis or the rows may follow helical lines about the axis.

The size of the mixing device will be determined largely by the size of the extruder that it is to be used with, and also by the desired output. For example, a convenient size of mixing device for use with an extruder having a screw of 3½″ diameter is one having an outer member of 3½″ internal diameter and 10″ length, the inner and outer members each having about 400 teeth spaced uniformly around each member so that the teeth on one member interleave the teeth on the other member.

The preheating may be effected solely by the use of hot gas as in the embodiment hereinbefore described by a method in which the material is held in a container before being fed to the extrusion apparatus, and while in the container hot gas is fed into the container at a level near to the bottom of the container. To assist in the even distribution of the hot gas the container is provided with two baffles each forming an inwardly projecting and downwardly sloping continuous shelf attached at its upper edge to the inner wall of the container, one baffle near the top and the other baffle near the bottom of the container with means for feeding hot gas in immediately below the lower baffle and means for extracting gas from immediately below the upper baffle. The container is most conveniently in circular horizontal cross section with each baffle in inverted frusto-conical form. With the necessarily large hoppers that are required with the much increased extrusion rates, the pressure drop and the volume of air required are very considerable, and powerful air blowers are required. Other forms of preheating may therefore be preferred, as illustrated in FIGURES 3 and 4.

FIGURE 3 illustrates an arrangement in which both conduction and convection are used to heat the material. The hopper is shown at 23 and is fitted with a coil 24 which can be heated by steam or other heated fluid to any desired temperature. Near the bottom of the hopper is shown the device 25 for blowing a gas up through the granules contained in the hopper to assist in heat transfer by convection. By passing the gas through a closed circuit, the gas entering the hopper through the device 25 may be kept at the required elevated temperature.

FIGURE 4 illustrates an apparatus in which the heat transfer medium used is a liquid of greater density than the material to be processed. The material is fed into a bath of the heated liquid and is separated therefrom by flotation and passed through a heated passage in which it is dried and fed to the extrusion apparatus. This apparatus has the advantage that any contaminating materials e.g. particles of metal, are easily separated out. The heating means in FIGURE 4 is water 28 contained in a tank fitted with a steam coil 31 to keep the water boiling. The polymeric material e.g. polyethene is fed from the hopper 26 and carried by the screw feed 27 into the boiling water bath. The material floats on the surface of the water and is swept along by the paddles 29 to the upward sloping perforated platform 30 where it is pushed out of the water bath and falls down the chute 35 on to the vibrating conveyer 33. The vibrating conveyer carries the material along to the feed hopper 34 of the extruder. The bottom of the water tank forms the roof of the conveying passage and provides heat to keep the polymer at the required temperature. Hot air is also blown through the inlet 32 into the conveying chamber to assist in drying the material.

Liquid heat transfer media of lower density than the material to be extruded may also be used, but in this case it is necessary to use a perforated conveyer or other device to lift the particles of material out of the liquid.

Our apparatus can be applied to many different kinds of thermoplastic organic polymeric materials e.g. polythene, a polyamide, polyvinyl chloride, polypropylene, polystyrene, and polymethyl methacrylate. The process is operated most efficiently with those materials that have a narrow softening range because with such materials it is possible by preheating to raise the temperature of the material considerably without causing the granules to fuse together.

The apparatus is particularly useful for extruding the normally solid polymers of ethylene because these materials can be heated to within about 10° C. of the softening point in the hopper. With this material it is possible to obtain extrusion rates of 2,000 lb. an hour and greater using our process on a 3½″ extruder geared to a 160 horse power motor by preheating the polymer to about 100° C.

By means of our process and apparatus it is possible to homogenise thermoplastic organic polymeric material, and if desired to disperse pigments or any other desired additives in the polymeric material, in extruders at very much higher rates than have hitherto been found possible.

While various embodiments of this invention are shown herein, suitable alternatives will be apparent to one skilled in the art. Therefore, the subject-matter described herein is to be considered in an illustrative and not in a limiting sense, when consideration is given to the following claims.

I claim:

Apparatus for extruding thermoplastic material such as polyethylene and the like, comprising an extruder having a feeding end, and an extrusion orifice, a hopper having an upper end and a lower end in communication with the feeding end of said extruder, said hopper including heating means providing introduction of heated gas into said hopper at the lower end thereof, and exhaust of said heated gas at the upper end of said hopper, means to rotate the extruder screw at speeds greater than 150 revolutions per minute, means providing a feed passage between the feeding end of said extruder screw and the extrusion orifice including a mixing device including a pair of coaxial generally cylindrical members relatively rotatable about the common axis, one surrounding the other with the space between adjacent surfaces providing said passage, and said adjacent surfaces having between them means movable across the direction of the longitudinal axis of said members by relative movement of said members.

References Cited in the file of this patent

UNITED STATES PATENTS

| | | |
|---|---|---|
| 2,295,942 | Fields | Sept. 15, 1942 |
| 2,409,521 | Wiley | Oct. 15, 1946 |
| 2,469,999 | Stober | May 10, 1949 |
| 2,732,587 | Greene | Jan. 31, 1956 |
| 2,736,064 | Rubin | Feb. 28, 1956 |
| 2,813,302 | Beck | Nov. 19, 1957 |

FOREIGN PATENTS

| | | |
|---|---|---|
| 212,157 | Australia | Jan. 10, 1957 |